US011431415B2

(12) United States Patent
Chen et al.

(10) Patent No.: US 11,431,415 B2
(45) Date of Patent: Aug. 30, 2022

(54) EXPANSION BRACKET WITH HEAT DISSIPATION FOR OPTICAL TRANSCEIVER SYSTEM

(71) Applicant: Quanta Computer Inc., Taoyuan (TW)

(72) Inventors: Yi-Chieh Chen, Taoyuan (TW); Yueh-Chang Wu, Taoyuan (TW); Te-Chuan Wang, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 8 days.

(21) Appl. No.: 17/119,430

(22) Filed: Dec. 11, 2020

(65) Prior Publication Data

US 2022/0190921 A1      Jun. 16, 2022

(51) Int. Cl.
*H04B 10/00* (2013.01)
*H04B 10/40* (2013.01)
*G02B 6/42* (2006.01)

(52) U.S. Cl.
CPC ........... *H04B 10/40* (2013.01); *G02B 6/4261* (2013.01); *G02B 6/4269* (2013.01)

(58) Field of Classification Search
CPC ...... H04B 10/40; H04B 10/43; G02B 6/4261; G02B 6/4269; G02B 6/4201; G02B 6/4271; G02B 6/4251; G02B 6/426; G02B 6/4268; G02B 6/4267; G02B 6/4266; G02B 6/4272; G02B 6/4273

USPC ......................................... 398/135–139, 164
See application file for complete search history.

(56) References Cited

U.S. PATENT DOCUMENTS

| 10,936,527 | B1* | 3/2021 | Chen ....................... G06F 1/185 |
| 2008/0211893 | A1* | 9/2008 | Oyanagi .............. B41J 11/0021 362/373 |
| 2011/0317964 | A1* | 12/2011 | Downs ................. G02B 6/4201 385/92 |
| 2016/0026600 | A1* | 1/2016 | Steinmacher-Burow .................... G06F 13/1694 710/301 |
| 2021/0359389 | A1* | 11/2021 | Wang ..................... H01Q 1/246 |

* cited by examiner

*Primary Examiner* — Hibret A Woldekidan
(74) *Attorney, Agent, or Firm* — Nixon Peabody LLP

(57) ABSTRACT

An electronic component such as a fan-less component for a 5G system having an expansion card and optical transceivers is disclosed. The electronic component has a chassis heat sink having a contact surface and a printed circuit board. A transceiver cage is located on the printed circuit board. The cage receives the optical transceiver. The transceiver cage is in thermal contact with the optical transceiver. The system includes a bracket having a heat sink support with a flat surface in thermal contact with the contact surface of the chassis heat sink. The bracket has a transceiver support having a flat surface in thermal contact with the optical transceiver and supporting the expansion card. A connector support is coupled to the heat sink support and the transceiver support. Heat from the optical transceiver is transmitted through the transceiver, connector, and the heat sink supports to the chassis heat sink.

20 Claims, 8 Drawing Sheets

EXPANSION BRACKET WITH HEAT DISSIPATION FOR OPTICAL TRANSCEIVER SYSTEM

TECHNICAL FIELD

The present disclosure relates generally to an optical transceiver system. More particularly, aspects of this disclosure relate to an expansion card bracket that allows for thermal transfer to a system heat sink to assist in thermal cooling for an optical transceiver.

BACKGROUND

Distributed network systems have been widely adopted with the emergence of the cloud for computing applications. Network systems encompass numerous connected devices including servers, switches, and other components that exchange data. Connections between such devices have generally been wired connections in the past, but with the demand for speed and increased amounts of data, faster optical signal cables have been used. For example, recent transmission speeds in optical systems exceed 10 Gbps and reach 100 Gbps, thus addressing the need for increased data capability and speed.

Optical signals are sent and received through transceivers that include electronics that are necessary to relay optical signals. An optical transceiver transmits and receives optical signals through an optical connector mated by optically active devices of a light-emitting device and a light-receiving device, each made of semiconductor materials. An optical transceiver includes electronic components and an optical receptacle that receives the optical connector. One type of optical transceiver is a plug-in optical transceiver. Such an optical transceiver is inserted into or removed from a transceiver cage provided on a printed circuit board in an optical switch device. The transceiver engages an electrical plug with an optical connector in the cage. The use of optical transceivers results in relatively more power consumption, and therefore heat generation by the electronic and optical devices in the optical transceiver. An effective heat-dissipating mechanism is thus required.

In the future, computing systems will require higher data transfer rate for different high speed applications. In order to achieve higher data transfer rate, such systems employ a fiber optical transceiver module that is generically termed SFP (small form-factor pluggable). Different varieties of such SFP transceivers are available such as SFP+, QSFP, SFP28, SFP56, QSFP28, QSFP56 . . . etc. The fiber optical transceiver module needs to be inserted into the cage on a circuit board inside the computing system.

Different kinds of fiber optical transceiver module have different data rate, such as 1G to 400G speeds. Higher data rates of fiber optical transceiver module usually require higher power dissipation from the high energy required for the higher data rates. Thus, thermal solutions are required for optical transceiver modules to function. Thermal solutions ensure the temperature is under the operating temperature of the optical transceiver module.

Referring generally to FIGS. 1A-1C, according to one example, a known optical transceiver assembly provides inefficient and/or insufficient heat transfer to a system heat sink from an optical transceiver. For known fiber optical transceiver modules, heat is usually conducted from the transceiver module to the cage a with heat sink. FIG. 1A is a perspective view of a prior art optical transceiver assembly 10 that includes a cage 12, a heat sink 14, and a clip 16. FIG. 1B shows an exploded view of a conventional cage and optical transceiver assembly 10. The cage 12 holds an optical such as the optical transceiver 18. Heat generated by the optical transceiver 18 is dissipated by the heat sink 14. The cage 12 is generally a rectangular shape with open ends. One of the open ends allows an optical connector to be attached to the optical transceiver. In this example, the cage 12 has a top aperture 20 that allows the heat sink 14 to directly contact the optical transceiver 18 for heat transmission. The clip 16 is employed to insure that the heat sink 14 is held to the cage and therefore maximizes contact with the optical transceiver 18.

Multiple optical transceivers may be arranged to provide multiple optical ports. FIG. 1C shows a prior art computer system such as an optical switch with one example arrangement of optical transceivers such as the transceiver assembly 10. In this example, the computer system 30 includes a front panel 32 that includes a connection aperture 34. A printed circuit board 36 supports an optical transceiver bracket 38. The bracket 38 holds two cages such as the cage 12 in a stacked arrangement. Thus, there may be two optical transceivers 18 and 40 in the two cages. Only one of the cages 12 has a heat sink 14. Thus, the heat sink 14 must dissipate the heat from both cages. Alternatively, the transceivers 18 and 40 may be in a belly to belly arrangement with another heat sink at the bottom of the printed circuit board 36 for better heat dissipation.

Referring generally to FIGS. 2A and 2B, according to another example, a known fan-less system also provides inefficient and/or insufficient heat transfer from an optical transceiver. FIG. 2A shows an assembled view of prior art optical transceivers in a fan less system such as a 5G component 50. Such components may include radio units (RU), distributed units (DU), or active antenna units (AAU). FIG. 2B shows an exploded view of the components of the optical transceivers in the fan-less component 50 in FIG. 2A. The known prior art fan-less component 50 includes a relatively large chassis heat sink 52 and a transceiver assembly 54. The chassis heat sink 52 is fabricated from a conductive material. A relatively large base 60 has a bottom surface in contact with the transceiver assembly 54. The top surface of the base 60 includes fins 62 that provide increased surface area to dissipate heat.

The transceiver assembly 54 includes a printed circuit board 70 that has a series of four optical transceivers 72 mounted in corresponding cages 74. The bottom of the printed circuit board 70 also suspends a series of four optical transceivers 82 mounted in corresponding cages 84. Each of the cages 74 has corresponding heat sinks 76. The heat sinks 76 are in thermal contact with a sheet of thermal interface material (TIM) 78. The thermal interface material 78 conducts heat from the transceivers 72 to the base 60 of the chassis heat sink 52. Thus, in a fan-less system, heat is conducted from the heat sinks 76 on the cages 74 to the system chassis heat sink 52 to dissipate the heat.

In 5G fan-less components such as radio units (RU), distributed units (DU), or active antenna units (AAU), a 5G operator usually desires the components have high performance may allow the installation of additional expansion cards to the system. Such an expansion card may impact thermal design due to the limited space inside the component. As the fiber optical transceiver modules have higher data rate requirements, such components require more heat dissipation, which is critical for fan-less system. Unfortunately, conventional assemblies do not permit the addition of an expansion card as heat dissipation requires contact with the system heat sink.

Thus, there is a need for an assembly that allows efficient heat transfer to a system heat sink from an optical transceiver. Additionally, and/or alternatively, there is a need for using a bracket for an expansion card to also function to transfer heat generated from an optical transceiver. Additionally, and/or alternatively, there is also a need for a bracket with high thermal conductivity to dissipate ambient heat while allowing the use expansion cards.

SUMMARY

One disclosed example is a thermally transmissive bracket operable to hold an expansion card in an electronic component system with an optical transceiver and a chassis heat sink. The bracket has a heat sink support having a flat surface in thermal contact with a flat surface of the chassis heat sink. A transceiver support has a flat surface in thermal contact with the optical transceiver and supports the expansion card. A connector support is coupled to the heat sink support and the transceiver support. Heat from the optical transceiver is transmitted through the transceiver support, the connector support, and the heat sink support to the chassis heat sink.

A further implementation of the example bracket is where the heat sink support and the transceiver support are in substantial parallel orientation to each other. Another implementation is where the heat sink support and the transceiver support overlap each other and overlap the expansion card. Another implementation is where the bracket includes a heat pipe within the heat sink, transceiver, and connector supports. Another implementation is where the bracket is fabricated from one of aluminum, graphite, or copper. Another implementation is where the bracket includes a thermally transmissive sheet on the exterior surfaces of the supports. Another implementation is where the sheet is copper foil, a graphite sheet, a graphene sheet. Another implementation is where a cage holds the transceiver and a heat sink in thermal contact with the transceiver support. Another implementation is where the electronic component system is a fan-less system for a 5G communication system.

Another disclosed example is an electronic component system including a chassis heat sink having a contact surface and a printed circuit board. A transceiver cage is located on the printed circuit board. The transceiver cage receives an optical transceiver. The transceiver cage is in thermal contact with the optical transceiver. An expansion card bracket includes a heat sink support having a flat surface in thermal contact with the contact surface of the chassis heat sink. The bracket includes a transceiver support having a flat surface in thermal contact with the optical transceiver and supporting an expansion card. The bracket includes a connector support coupled to the heat sink support and the transceiver support. Heat from the optical transceiver is transmitted through the transceiver support, the connector support, and the heat sink support to the chassis heat sink.

A further implementation of the example system includes a cage heat sink thermally coupled to the transceiver cage. Another implementation is where the system includes a thermal insulation sheet between the contact surface of the heat sink and the bracket. Another implementation is where the expansion card is a network interface card or a network accelerator. Another implementation is where the heat sink connector and the transceiver connector are in a substantially parallel orientation to each other. Another implementation is where the heat sink connector and the transceiver connector overlap each other and overlap the expansion card. Another implementation is where the bracket includes a heat pipe within the heat sink, transceiver, and connector supports. Another implementation is where the bracket is fabricated from one of aluminum, graphite, and copper. Another implementation is where the bracket includes a thermally transmissive sheet on the exterior of the supports. Another implementation is where the sheet is copper foil, a graphite sheet, a graphene sheet. Another implementation is where the printed circuit board includes components for performing 5G network operations.

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims.

BRIEF DESCRIPTION OF THE DRAWINGS

The disclosure will be better understood from the following description of exemplary embodiments together with reference to the accompanying drawings, in which.

Figure 1A:
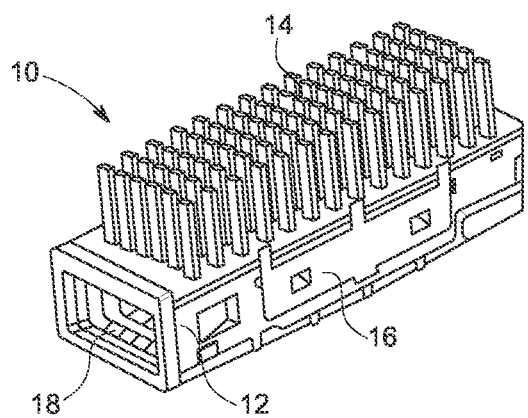
FIG. 1A is a perspective view of a prior art optical transceiver assembly.
Figure 1B:
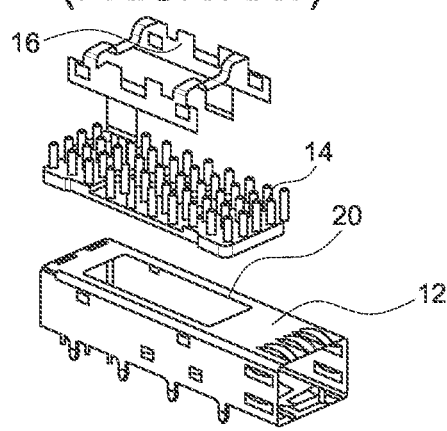
FIG. 1B shows an exploded view of the components of the prior art optical transceiver assembly in FIG. 1A.
Figure 1C:
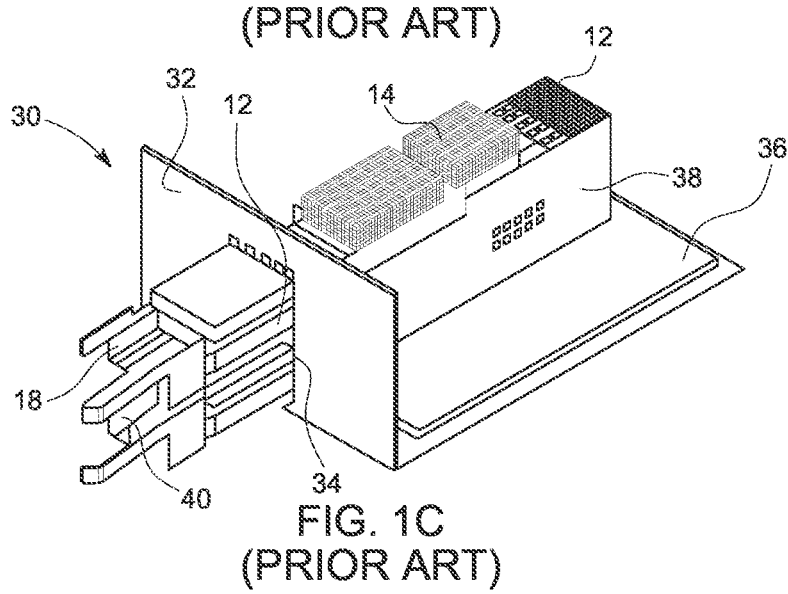
FIG. 1C is a perspective view of one example prior art arrangement of optical transceivers such as the transceiver assembly in FIG. 1A.
Figure 2A:
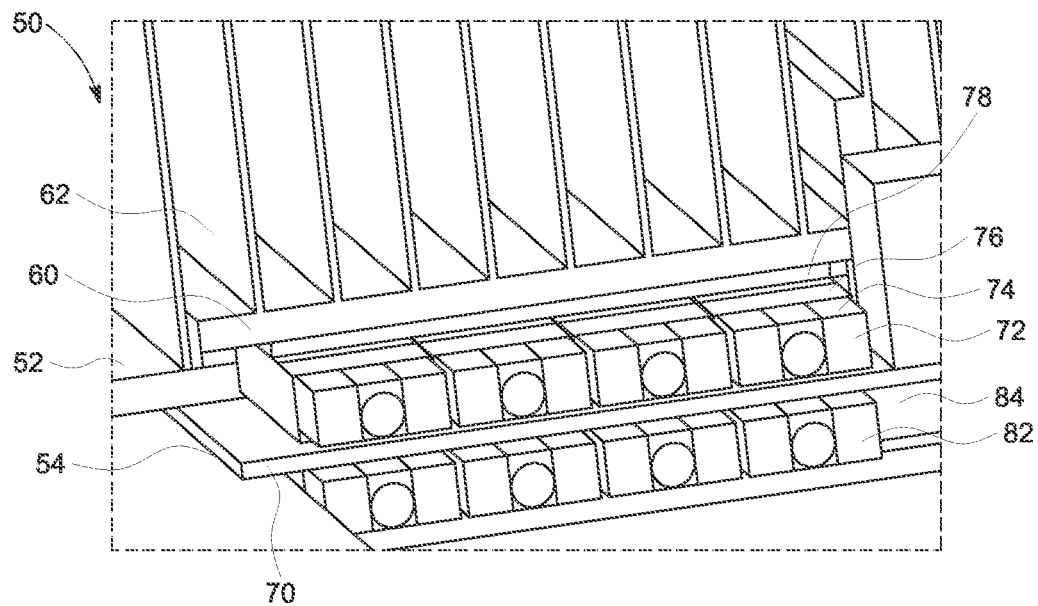
FIG. 2A shows an assembled view of a cage assembly of cages and transceivers in a prior art fan less system.
Figure 2B:
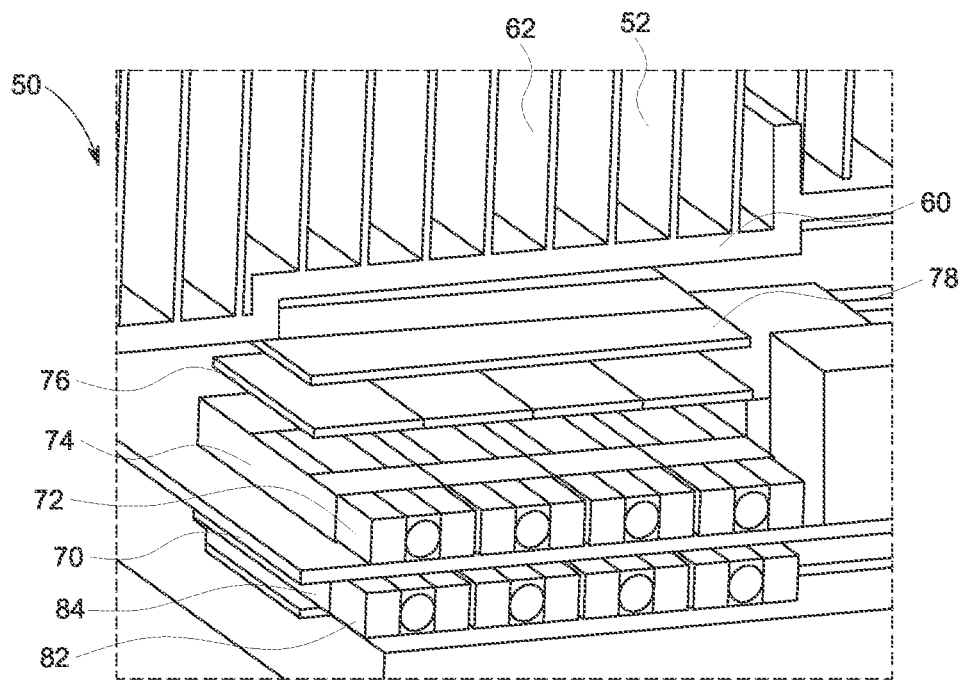
FIG. 2B shows an exploded view of the components of the prior art optical transceiver assembly in FIG. 2A.

The present disclosure is susceptible to various modifications and alternative forms, and some representative embodiments have been shown by way of example in the drawings and will be described in detail herein. It should be understood, however, that the invention is not intended to be limited to the particular forms disclosed. Rather, the disclosure is to cover all modifications, equivalents, and alternatives falling within the spirit and scope of the invention as defined by the appended claims.

DETAILED DESCRIPTION OF THE ILLUSTRATED EMBODIMENTS

The present inventions can be embodied in many different forms. Representative embodiments are shown in the drawings, and will herein be described in detail. The present disclosure is an example or illustration of the principles of the present disclosure, and is not intended to limit the broad aspects of the disclosure to the embodiments illustrated. To that extent, elements and limitations that are disclosed, for example, in the Abstract, Summary, and Detailed Description sections, but not explicitly set forth in the claims, should not be incorporated into the claims, singly or collectively, by implication, inference, or otherwise. For purposes of the present detailed description, unless specifically disclaimed, the singular includes the plural and vice versa; and the word "including" means "including without limitation." Moreover, words of approximation, such as "about," "almost," "substantially," "approximately," and the like, can be used herein to mean "at, near, or nearly at," or "within 3-5% of" or "within acceptable manufacturing tolerances," or any logical combination thereof, for example.

The present disclosure relates to a card bracket that allows for the installation of an expansion card and facilitates heat dissipation in a thermal solution for fan-less components. The example bracket thus may be applied in fan-less products, such as radio units (RU), distributed units (DU), or active antenna units (AAU) with a chassis heat sink as a thermal solution. The cooling assembly uses the external card bracket to conduct the transceiver module heat to the outer chassis heat sink and dissipate heat to the ambient environment. The example external card bracket can also use high thermal conductivity material to enhance thermal performance such as metal plate embedded heat-pipe, aluminum, copper, graphite or attaching a copper foil, graphite sheet, graphene sheet on the external card bracket surface.

Figure 3A:
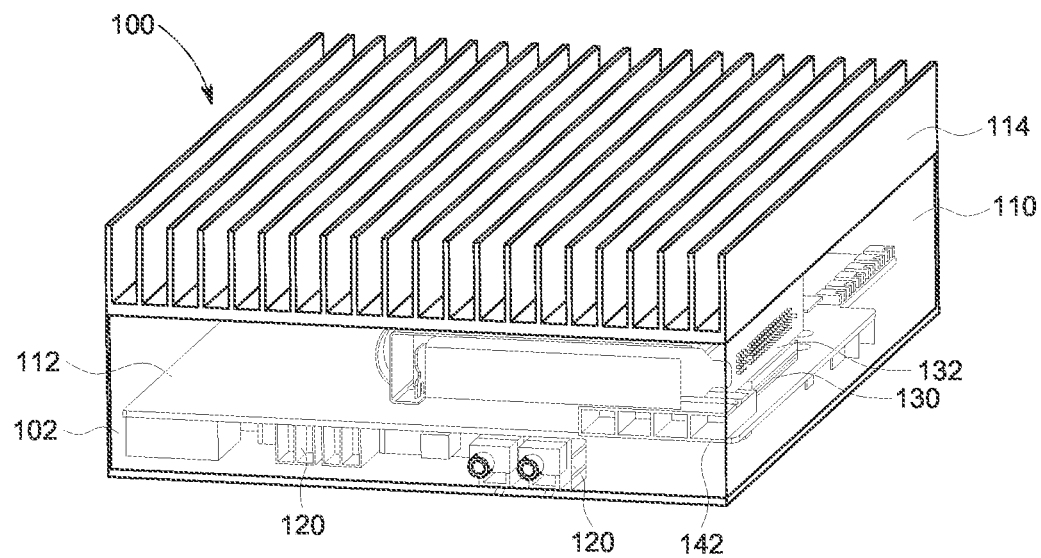
FIG. 3A is a perspective view of a fan-less communication component with optical transceivers, the component including an example expansion card bracket.

Referring generally to FIGS. 3A-3D, a fan-less component 100 (shown in FIGS. 3A and 3B) includes optical transceivers and an example expansion card bracket. Referring specifically to FIG. 3A, the example component 100 is a 5G component (such as a distributed unit (DU), radio unit (RU), or an active antenna unit (AAU)) that relies on a fan-less cooling system to cool its electronic components. In this example, the component 100 is a distributed unit (DU) that includes a housing 110, which holds a printed circuit board 112 and a chassis heat sink 114. The DU is part of a 5G communication system that is characterized by 5G has high speed, low latency, large bandwidth, and more connections that allows more and more data to be processed. In this example, the DU component 100 typically includes a mainboard and a PCIe card. The PCIe card will typically include a smart network interface card (NIC) with a time sync function and an acceleration card for networking operations. The chassis heat sink 114 is attached to the top of the housing 110 to allow transmission of heat generated by the component 100 to the ambient exterior environment. The printed circuit board 112 supports various electronic components performing functions for 5G communications. Thus, the printed circuit board 112 will typically include a CPU, double data rate (DDR) memory, physical layer key generation circuits, and small form-factor pluggable (SFP) optical and RJ45 type connectors.

As explained below, the housing 110 includes various connectors 120 for receiving signals from external device and transmitting the signals to components on the circuit board 112. The circuit board 112 includes a series of transceiver cages 142 that hold optical transceivers. The circuit board 112 also includes an expansion slot 130 for receiving a connector of a vertical riser board 132. The vertical riser board 132 supports expansion cards as will be explained below.

Figure 3B:
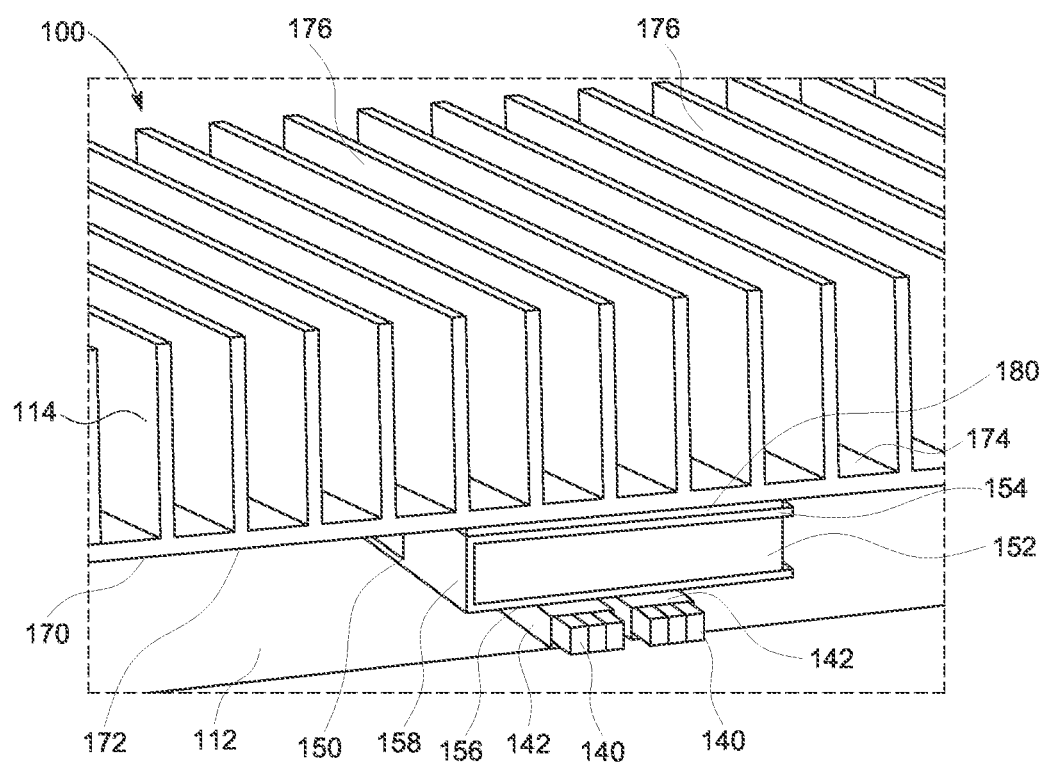
FIG. 3B is a close-up perspective view of the example bracket used in conjunction with the thermal cooling system in the example component in FIG. 3A.

Referring specifically to FIG. 3B, the printed circuit board 112, according to the illustrated example, has optical transceivers 140 that are mounted in cages 142 and are attached to the printed circuit board 112. In this example, the cages 142 have a generally rectangular shape. In this example, there are two optical transceivers 140, but any number of optical transceivers may be used. The optical transceivers 140 include sockets that are positioned externally of the housing 110 for connection to optical connectors. The optical connectors carry optical signals for transmission to and reception by the electronic components on the printed circuit board 112.

An expansion card bracket 150 is attached to the printed circuit board 112. The expansion card bracket 150 allows thermal transmission of heat generated by the optical transceivers 140 to the chassis heat sink 114. The expansion card bracket 150 holds an expansion card 152 that has connectors, such as PCIe type connectors, which allow connection of the expansion card 152 to a socket on the riser board 132 shown in FIG. 3A. The riser board 132 allows communication with the card 152 via the expansion slot 130 (FIG. 3A) on the printed circuit board 112.

In this example, the expansion card 152 is a smart network interface controller (NIC) card. Other expansion cards may include an acceleration card for networking or other PCIe compatible devices. Although a single expansion card 152 is shown with the bracket 150 in FIG. 3B, additional expansion cards similar to the expansion card 152 may be provided with brackets similar to the bracket 150 between the printed circuit board 112 and the chassis heat sink 114.

The material of the bracket 150 is a heat conductive material such as aluminum, copper or graphite or a similar material to transmit heat from the optical transceivers 140 to the chassis heat sink 114. The bracket 150 may also include registration features that allows the bracket 150 to be attached to the circuit board 112.

The chassis heat sink support 154 has a generally flat surface that transmits heat to the chassis heat sink 114. The chassis heat sink 114 includes a base 170 that has a bottom surface 172 and a top surface 174. The bottom surface 172 serves as a contact surface in thermal communication with the chassis heat sink support 154. A series of vertical fins 176 extend from the top surface 174. The vertical fins 176 increase the surface area available to dissipate heat from the chassis heat sink 114 to the ambient environment. A layer of thermal insulation material 180 is inserted between the bottom surface 172 and the heat sink support 154 to facilitate heat transfer.

Figure 3C:
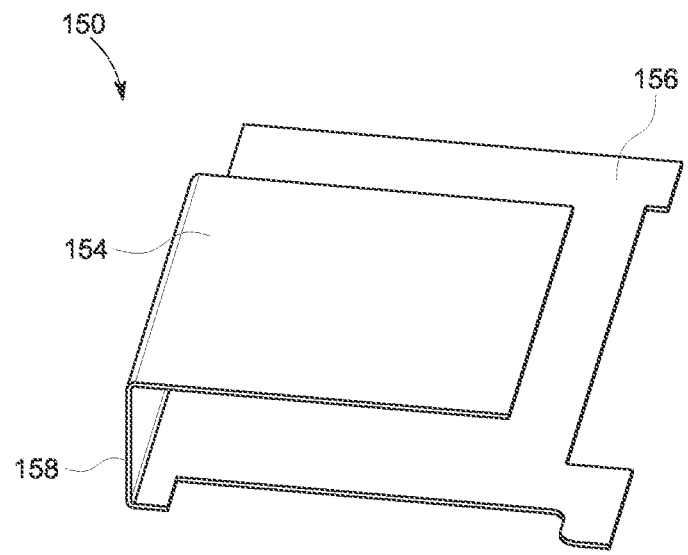
FIG. 3C is a perspective view of the example expansion card bracket in FIG. 3B.

FIG. 3C is a perspective view of the example bracket 150 in FIG. 3B. As shown in detail in FIGS. 3B-3C, the expansion card bracket 150 includes a chassis heat sink support 154 and a transceiver support 156. A connection support 158 connects the heat sink support 154 and the transceiver support 156. In this example, the connection support 158 is at an approximately perpendicular orientation to the heat sink support 154 and the transceiver support 156. The supports 154, 156, and 158 in this example are arranged to bracket the expansion card 152 (FIG. 3B), and to hold the expansion card 152 between the transceivers 140 on the printed circuit board 112 and the chassis heat sink 114. Thus, the supports 154 and 156 overlap the expansion card 152 and also overlap each other.

In this example, the supports 154, 156, and 158 of the bracket 150 are fabricated as a single part. In other embodiments, the supports 154, 156, and 158 of the bracket 150 are fabricated as individual parts that are fastened or otherwise attached to each other.

Figure 3D:
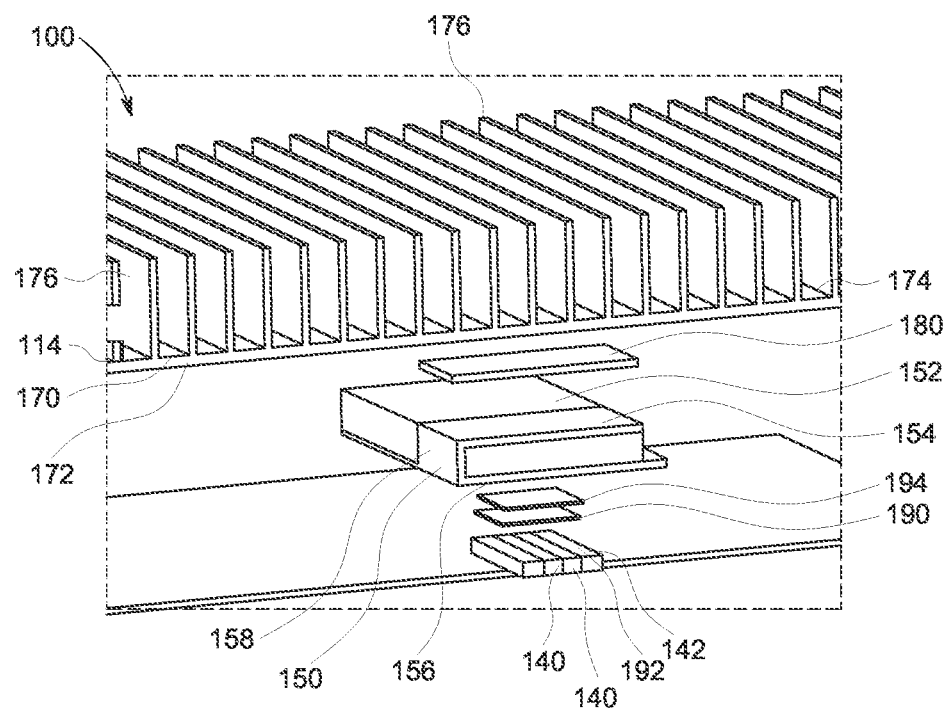
FIG. 3D is an exploded perspective view of the components of the thermal cooling system in FIG. 3B.

FIG. 3D is an exploded perspective view of the components that allow thermal transmission in the component 100. As shown in detail in FIG. 3D, the cages 142 in this example include features to hold a heat sink 190. The heat sink 190 contacts the transceiver 140 through an aperture on the top of each of the cages 142. A thermal insulation sheet 192 is placed between the optical transceiver 140 and one surface of the heat sinks 190 to provide more efficient thermal transfer. The heat sink 190 conducts heat generated from the transceiver 140 to the transceiver support 156. In this example, a layer of thermal insulation material 194 is inserted between the heat sinks 190 and the transceiver support 156 to facilitate efficient heat transfer.

Figure 3E:
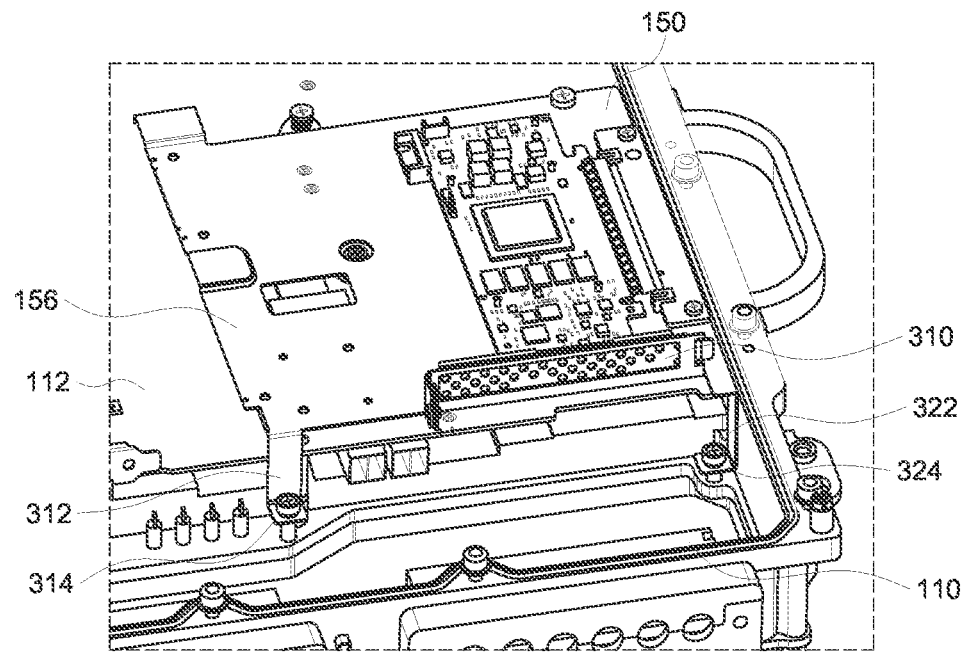
FIG. 3E is a perspective view of the example expansion card bracket installed on the circuit board and housing of the example component in FIG. 3A.

FIG. 3E is a partial cutaway view of the transceiver support 156 of the example bracket 150 (supports 154 and 158 removed for clarity) showing the attachment features for the card 152 in FIGS. 3A-3C and the circuit board 112. The transceiver support 156 includes an edge that supports a vertical card panel 310. The panel 310 may be attached to the card 152 (not shown) via brackets and screws to hold the card to the bracket 150. The support 156 has a vertical arm 312 that has a perpendicular tab 314 that may be attached to the chassis via a screw. A second vertical arm 322 has a perpendicular tab 324 that may be attached to the chassis via another screw.

Figure 4A:
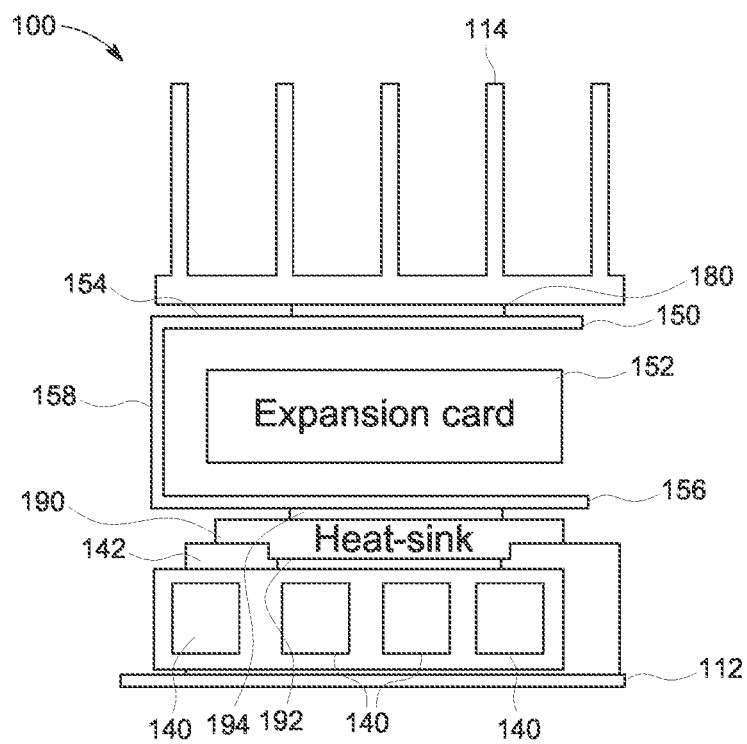
FIG. 4A is a front cross-section view of the components of the thermal cooling system in FIG. 3B including the expansion card bracket.

FIG. 4A is a front cross-section view of the heat dissipation provided by the example expansion card bracket 150. Like elements in FIG. 4A are labeled with like numerals as their counterparts in FIGS. 3A-3D. Heat generated by the transceivers 140 is dissipated by the heat sinks 190. The heat sinks 190 are placed in the aperture at the top of the cages 142. The opposite surfaces of the heat sinks 190 are in contact with the transceiver support 156 through the thermal insulation material sheet 194. The heat is conducted through the transceiver support 156, to the connection support 158, and to the chassis support 154. The heat is then dissipated by the chassis heat sink 114.

The expansion card bracket 150 allows the installation of the expansion card 152 to increase the functionality of the component 100. The heat conduction material of the expansion bracket 150 allows for efficient heat dissipation by routing heat generated by the transceivers 140 to the heat sink 114. Such ambient heat dissipation through the bracket 150 and the chassis heat sink 114 allows the operation of a fan-less component 100 with expansion cards.

There may be different variations to enhance thermal efficiency for the general design of an expansion card bracket that is inserted between the chassis heat sink 114 and the transceivers 140. The thermal transmissive properties of the expansion card bracket 150 allow the addition of expansion cards in a fan-less system. Such expansion cards can increase the operation capabilities of the system while not requiring any additional thermal management components.

Figure 4B:
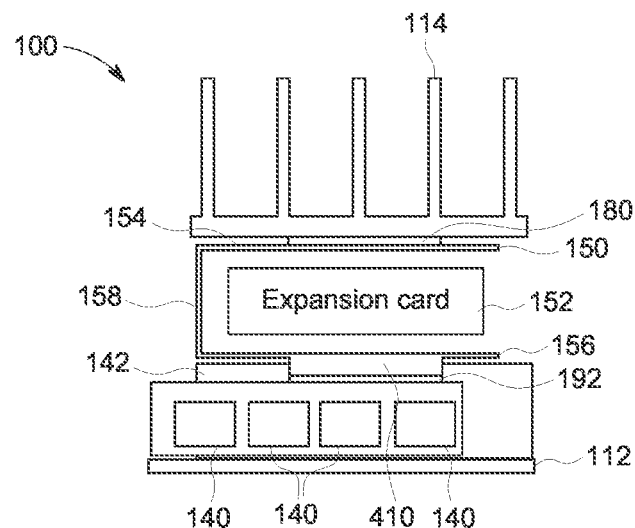
FIG. 4B is a front cross-section view of alternate components of the thermal cooling system in FIG. 4A.

FIG. 4B is a front cross-section view of a variation of some thermal transmission components of the component 100 in FIG. 4A. Like elements in FIG. 4B are labeled with like reference numerals as their counterparts in FIG. 4A. The bracket 150 allows the installation of the expansion card 152 to the component 100. The bracket 150 is interposed between the transceivers 140 and the heat sink 114. However, in contrast to the arrangement illustrated in FIG. 4A, the transceivers 140 illustrated in FIG. 4B do not have separate heat sinks. Instead, in the example illustrated in FIG. 4B, the transceiver support 156 includes a protrusion 410 that fits in the aperture of the cage 142. The protrusion 410 is in contact with the thermal insulation material sheet 192. Thus, heat from the transceivers 140 is thermally transmitted through the thermal insulation material sheet 192 to the transceiver support 156. The heat is then conducted by the transceiver support 156, through the connection support 158, to the chassis support 154, and to the chassis heat sink 114.

Although the lack of heat sinks on the transceivers 140 in FIG. 4B is less thermally efficient than the arrangement in FIG. 4A, nevertheless, the arrangement of FIG. 4B is useful for applications with relatively lower speed optical transceivers that, thus, require less cooling. The arrangement in FIG. 4B also requires less parts than the arrangement in FIG. 4A.

Figure 4C:
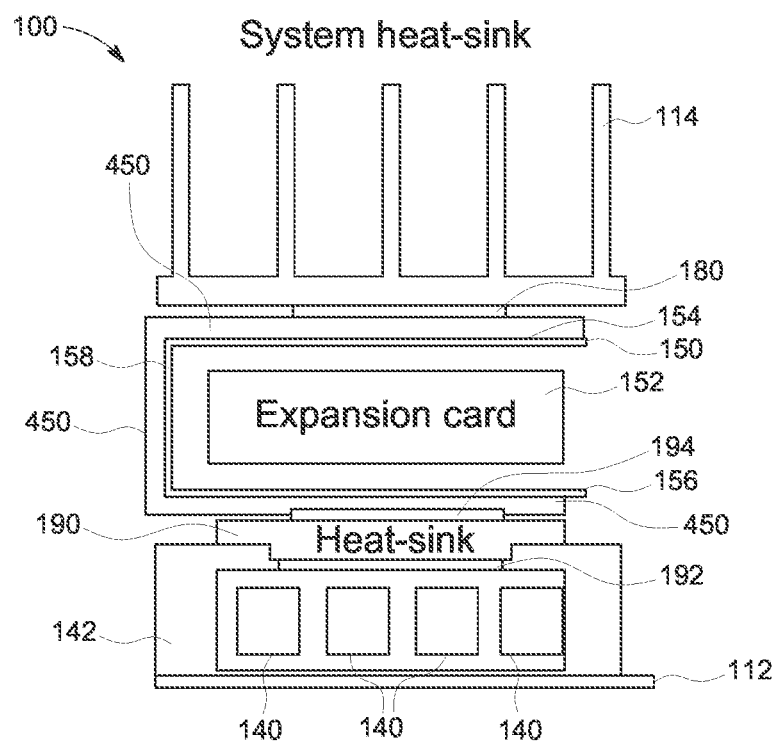
FIG. 4C is a front cross-section view of an additional thermal sheet added to the expansion card bracket in FIG. 4A.

The bracket 150 is optionally provided with layers of conductive material. The layers of conductive material include, for example, a copper foil, a graphite sheet, and a graphene sheet on the external surfaces of the supports 154, 156, and 158 to facilitate heat transfer. FIG. 4C shows the bracket 150 with the application of a single thermally conductive material sheet 450 that may be attached to supports 154, 156, and 158. Like elements in FIG. 4C are labeled with like reference numerals as their counterparts in FIG. 4A. The thermally conductive sheet 450 may have an adhesive pre-applied with a peel off protective layer. Alternatively, the adhesive may be applied to the bracket 150 and the conductive sheet 450 may be then applied. The conductive sheet 450 is thus attached to the supports 154, 156, and 158 via the adhesive. Alternatively, the single sheet 450 may be applied as different panels to the supports 154, 156, and 158.

Figure 5A:
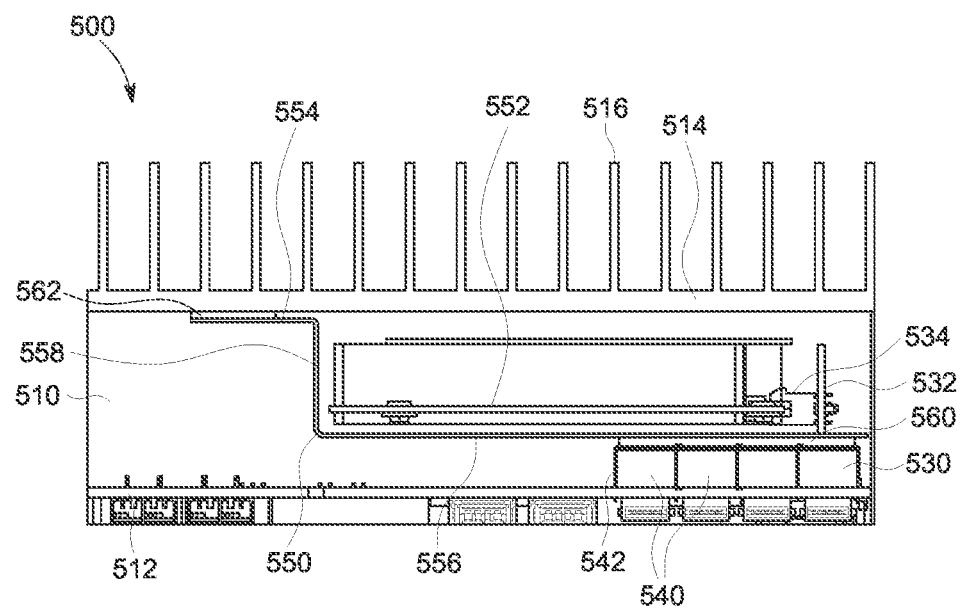
FIG. 5A is a front cross-section view of another example bracket in a fan-less communication component.
Figure 5B:
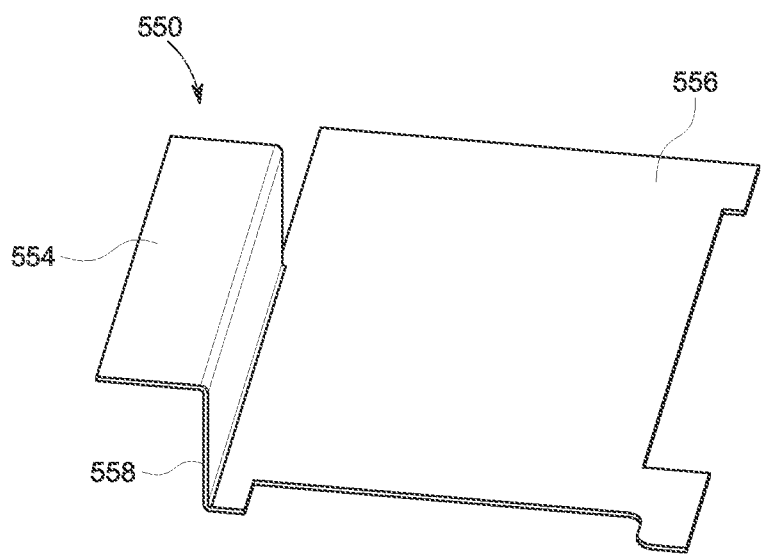
FIG. 5B is a perspective view of the example bracket in FIG. 5A.

Referring generally to FIGS. 5A and 5B, another exemplary embodiment of an expansion card bracket is described. FIG. 5A shows a front cross-section view of another example fan-less communication component 500 that allows for the provision of an expansion card bracket 550. According to another example, a fan-less communication component 500 allows for the provision of an expansion card bracket 550. The component 500 includes a housing 510 that holds a printed circuit board 512 and a chassis heat sink 514. The chassis heat sink 514 is attached to the top of the housing 510 to allow transmission of heat generated by the component 500 to the ambient exterior environment. The chassis heat sink 514 includes vertical vanes 516 to assist in dissipating heat. The circuit board 512 also includes an expansion slot 530. In this example, a vertical riser board 532 has an edge connector that is inserted in the slot 530. The vertical riser board 532 has a socket 534 that supports expansion cards as will be explained below.

The printed circuit board 512 in this example has optical transceivers 540 that are mounted in cages 542 attached to the printed circuit board 512. In this example, there are four optical transceivers 540, but any number of optical transceivers may be used. The optical transceivers 540 include sockets that are positioned external to the housing 510 for connection to optical connectors. The optical connectors carry optical signals for transmission to and reception by components on the printed circuit board 512.

Referring specifically to FIG. 5B, an exemplary expansion card bracket 550 is attached to hold an expansion card 552 between the printed circuit board 512 and the chassis heat sink 514. The bracket 550 includes a chassis heat sink support 554 and a transceiver support 556. A connection support 558 connects the heat sink support 554 and the transceiver support 556. In this example, the connection support 558 is at an approximately perpendicular orientation to the heat sink support 554 and to the transceiver support 556. The support 556 overlaps the expansion card 552 and is interposed between the expansion card 552 and the cages 542 of the transceivers 540 in FIG. 5A. The heat sink support 554 extends in an opposite direction from the connection support 558 from the direction of the transceiver support 556.

Referring back to FIG. 5A, the supports 554, 556, and 558 in this example are arranged to position the expansion card 552 between the transceivers 540 and the chassis heat sink 514. Heat generated by the transceivers 540 is dissipated by a thermal insulation material layer 560 that contacts the transceivers 540 and the transceiver support 556 to allow for efficient transmission of heat. The heat is conducted through the transceiver support 556 to the connection support 558 to the heat chassis support 554. The heat chassis support 554 has a flat surface in thermal contact with a bottom surface of the chassis heat sink 514. A thermal insulation material layer 562 is located between the heat chassis support 554 and the chassis heat sink 514 to facilitate heat transfer. The heat is then dissipated by the chassis heat sink 514 to the ambient environment. Additional heat transfer is achieved by adding individual heat sinks to each of the cages 542. The individual heat sinks would be seated by apertures in the cages and would contact the transceivers.

The expansion card bracket 550 allows the installation of the expansion card 552 to increase the functionality of the component 500. The heat conduction material of the expansion bracket 550 allows for efficient heat dissipation by routing heat generated by the transceivers 540 to the chassis heat sink 514. Such ambient heat dissipation through the bracket 550 and the chassis heat sink 514 allows the operation of a fan-less component with the addition of expansion cards.

Figure 6A:
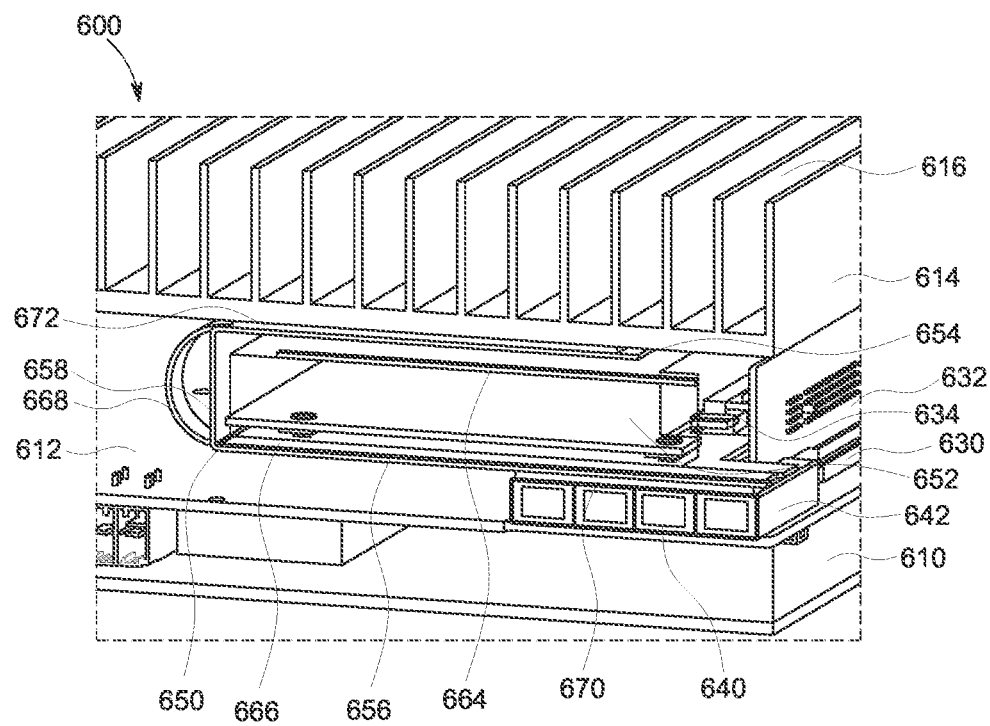
FIG. 6A is a perspective view of a fan-less communication component with optical transceivers having an example expansion card bracket with a heat pipe.
Figure 6B:
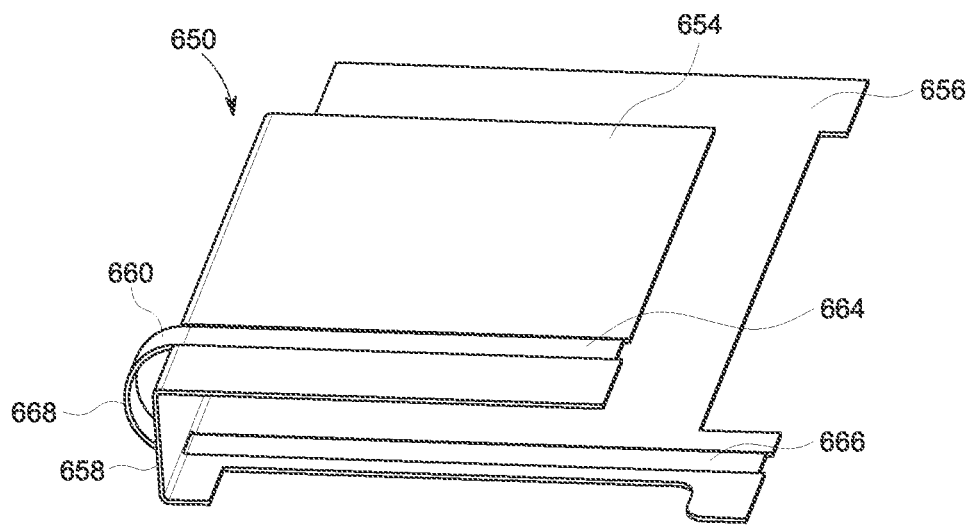
FIG. 6B is perspective view of the example bracket in FIG. 6A.

Referring generally to FIGS. 6A and 6B, a fan-less communication component includes an alternative expansion bracket that is different than the expansion bracket 150 illustrated in FIG. 3C, and which further enhances heat conduction. Referring specifically to FIG. 6A, an alternative embodiment includes a fan-less communication component 600 that allows for the provision of an expansion card bracket 650 with enhanced thermal transmission. The component 600 includes a housing 610 that holds a printed circuit board 612 and a chassis heat sink 614. The chassis heat sink 614 is attached to the top of the housing 610 to allow transmission of heat generated by the component 600 to the ambient exterior environment. The chassis heat sink 614 includes vertical vanes 616 to assist in heat dissipation. The circuit board 612 also includes an expansion slot 630. In this example, a vertical riser board 632 has an edge connector that is inserted in the expansion slot 630. The vertical riser board 632 has a socket 634 that supports expansion cards as will be explained below.

The printed circuit board 612 in this example has optical transceivers 640 that are mounted in cages 642, and which are attached to the printed circuit board 612. Although this example describes four optical transceivers 640, it is understood that any number of optical transceivers may be used. The optical transceivers 640 include sockets that are positioned at the exterior of the housing 610 for connection to optical connectors carrying optical signals for transmission and reception by the components on the printed circuit board 612.

The expansion card bracket 650 is attached to hold an expansion card 652 between the printed circuit board 612 and the chassis heat sink 614. Referring specifically to FIG. 6B, the bracket 650 includes a chassis heat sink support 654 and a transceiver support 656. A connection support 658 connects the heat sink support 654 and the transceiver support 656. In this example, the connection support 658 is at an approximately perpendicular orientation to the heat sink support 654 and the transceiver support 656.

The bracket 650 includes a heat pipe 660 to facilitate heat transfer through the bracket 600. In this example, the heat pipe 660 includes an interior area that holds liquid. The liquid moves heat absorbed by the heat pipe 660 internally through the heat pipe 660 in an efficient manner. In this example, the heat pipe 660 has three sections 664, 666, and 668 that are fluidly connected.

Referring back to FIG. 6A, the supports 654, 656, and 658 in this example are arranged to position the expansion card 652 between the transceivers 640 and the chassis heat sink 614. Heat generated by the transceivers 640 is dissipated by a thermal insulation material layer 670 that contacts the transceivers 640 and the transceiver support 656 to allow for efficient transmission of heat. As explained above, additional thermal transfer may be achieved by providing heat sinks for each of the transceivers 640. The heat is conducted through the transceiver support 656 (shown in FIG. 6B) to the connection support 658 to the heat chassis support 654. The heat chassis support 654 has a flat surface in thermal contact with a bottom surface of the chassis heat sink 614. A thermal insulation material layer 672 is located between the heat chassis support 654 and the chassis heat sink 614 to facilitate heat transfer.

The section 666 of the heat pipe 660 is embedded along the length of the transceiver support 656 of the bracket 600 and absorbs heat from the transceivers 640. The liquid in the section 666 is heated. The section 668 is in a curved shape and arches over the connector support 658. Fluid in the curved section 668 receives heat from the liquid in the section 666. The final section 664 is embedded along the length of the heat sink support 654, and the liquid in this section conveys the heat to the chassis heat sink 614. The heat then may be dissipated by the chassis heat sink 614 to the ambient environment. Although one heat pipe is embedded in the bracket 650 in this example, multiple heat pipes may be provided along the length of the bracket 650 to facilitate increased heat transmission.

As used in this application, the terms "component," "module," "system," or the like, generally refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller, as well as the controller, can be a component. One or more components may reside within a process and/or thread of execution, and a component may be localized on one computer and/or distributed between two or more computers. Further, a "device" can come in the form of specially designed hardware; generalized hardware made specialized by the execution of software thereon that enables the hardware to perform specific function; software stored on a computer-readable medium; or a combination thereof.

The terminology used herein is for the purpose of describing particular embodiments only, and is not intended to be limiting of the invention. As used herein, the singular forms "a," "an," and "the" are intended to include the plural forms as well, unless the context clearly indicates otherwise. Furthermore, to the extent that the terms "including," "includes," "having," "has," "with," or variants thereof, are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art. Furthermore, terms, such as those defined in commonly used dictionaries, should be interpreted as having a meaning that is consistent with their meaning in the context of the relevant art, and will not be interpreted in an idealized or overly formal sense unless expressly so defined herein.

While various embodiments of the present invention have been described above, it should be understood that they have been presented by way of example only, and not limitation. Although the invention has been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application. Thus, the breadth and scope of the present invention should not be limited by any of the above described embodiments. Rather, the scope of the invention should be defined in accordance with the following claims and their equivalents.

What is claimed is:

1. A thermally transmissive bracket operable to hold an expansion card in an electronic component system with an optical transceiver and a chassis heat sink, the bracket comprising:
    a heat sink support having a flat surface in thermal contact with a flat surface of the chassis heat sink;
    a transceiver support having a flat surface in thermal contact with the optical transceiver and an opposite flat surface that supports the expansion card;
    a connector support coupled to the heat sink support and the transceiver support, wherein the bracket is operable to hold the expansion card between the optical transceiver and the chassis heat sink, and wherein heat from the optical transceiver is transmitted through the transceiver support, the connector support, and the heat sink support to the chassis heat sink.

2. The bracket of claim 1, wherein the heat sink support and the transceiver support are in substantial parallel orientation to each other.

3. The bracket of claim 1, wherein the heat sink support and the transceiver support overlap each other and overlap the expansion card.

4. The bracket of claim 1, further comprising a heat pipe within the heat sink, transceiver, and connector supports.

5. The bracket of claim 1, wherein the bracket is fabricated from one of aluminum, graphite, or copper.

6. The bracket of claim 1, further comprising a thermally transmissive sheet on exterior surfaces of the supports.

7. The bracket of claim 6, wherein the sheet is copper foil, a graphite sheet, a graphene sheet.

8. The bracket of claim 1, wherein a cage holds the transceiver and a heat sink in thermal contact with the transceiver support.

9. The bracket of claim 1, wherein the electronic component system is a fan-less system for a 5G communication system.

10. An electronic component system, comprising:
    a chassis heat sink having a contact surface;
    a printed circuit board;
    a transceiver cage on the printed circuit board, the transceiver cage receiving an optical transceiver, the transceiver cage in thermal contact with the optical transceiver; and
    an expansion card bracket including:
        a heat sink support having a flat surface in thermal contact with the contact surface of the chassis heat sink;
        a transceiver support having a flat surface in thermal contact with the optical transceiver and an opposite flat surface supporting an expansion card; and
        a connector support coupled to the heat sink support and the transceiver support, wherein the bracket is operable to hold the expansion card between the optical transceiver and the chassis heat sink, and wherein heat from the optical transceiver is transmitted through the transceiver support, the connector support, and the heat sink support to the chassis heat sink.

11. The electronic component system of claim 10, further comprising a cage heat sink thermally coupled to the transceiver cage.

12. The electronic component system of claim 10, further comprising a thermal insulation sheet between the contact surface of the heat sink and the bracket.

13. The electronic component system of claim 10, wherein the expansion card is one of network interface card or a network accelerator.

14. The electronic component system of claim 10, wherein the heat sink support and the transceiver support are in a substantially parallel orientation to each other.

15. The electronic component system of claim 10, wherein the heat sink support and the transceiver support overlap each other and overlap the expansion card.

16. The electronic component system of claim 10, wherein the bracket includes a heat pipe within the heat sink, transceiver, and connector supports.

17. The electronic component system of claim 10, wherein the bracket is fabricated from one of aluminum, graphite, and copper.

18. The electronic component system of claim 10, wherein the bracket includes a thermally transmissive sheet on exterior surfaces of the supports.

19. The electronic component system of claim 18, wherein the sheet is copper foil, a graphite sheet, a graphene sheet.

20. The electronic component system of claim 10, wherein the printed circuit board includes components for performing 5G network operations.

* * * * *